US009606775B2

(12) United States Patent
Jiang et al.

(10) Patent No.: US 9,606,775 B2
(45) Date of Patent: Mar. 28, 2017

(54) DEVELOPING RICH INTERNET APPLICATION

(71) Applicant: International Business Machines Corporation, Armonk, NY (US)

(72) Inventors: Ran Jiang, Beijing (CN); Qi Ruan, Ningbo (CN); Qiao Yun Sun, Beijing (CN); Shu Chao Wan, Beijing (CN); Xiang Zhou, Shanghai (CN)

(73) Assignee: International Business Machines, Armonk, NY (US)

( * ) Notice: Subject to any disclaimer, the term of this patent is extended or adjusted under 35 U.S.C. 154(b) by 0 days.

(21) Appl. No.: 14/722,592

(22) Filed: May 27, 2015

(65) Prior Publication Data

US 2015/0378688 A1  Dec. 31, 2015

(30) Foreign Application Priority Data

Jun. 27, 2014  (CN) .......................... 2014 1 0301689

(51) Int. Cl.
*G06F 9/44* (2006.01)
*G06F 17/30* (2006.01)

(52) U.S. Cl.
CPC .................. *G06F 8/30* (2013.01); *G06F 8/34* (2013.01); *G06F 8/38* (2013.01); *G06F 17/3089* (2013.01)

(58) Field of Classification Search
CPC ..... G06F 8/30; G06F 8/41; G06F 8/38; G06F 8/3089

(Continued)

(56) References Cited

U.S. PATENT DOCUMENTS 5,410,648 A * 4/1995 Pazel ............................ 717/124
6,353,923 B1 * 3/2002 Bogle et al. .................. 717/128

(Continued)

FOREIGN PATENT DOCUMENTS

WO   2007028227 A1   3/2007
WO   2010129432 A3   11/2010

OTHER PUBLICATIONS

Cicchetti et al., "Supporting Incremental Synchronization in Hybrid Multi-view Modelling," MODELS 2011 Workshops, LNCS 7167, pp. 89-103, 2012, Copyright Springer-Verlag Berlin Heidelberg 2012.

(Continued)

*Primary Examiner* — Lewis A Bullock, Jr.
*Assistant Examiner* — Theodore Hebert
(74) *Attorney, Agent, or Firm* — Mark G. Edwards (57) ABSTRACT

The present invention includes a method and apparatus for developing a Rich Internet Application. In one embodiment, there is provided a method for developing a Rich Internet Application, comprising: defining a code space used for a code set, the code set being associated with a view that is to be displayed in the Rich Internet Application; and adjusting the code space so that the adjusted code space is independent of another code space used for another code set, wherein the other code set is associated with another view that is to be displayed in the Rich Internet Application. In one embodiment of the present invention, there is provided an apparatus for developing a Rich Internet Application. By means of the method and apparatus as described in the present invention, conflicts between code sets associated with various views to be displayed in the Rich Internet Application may be isolated.

20 Claims, 9 Drawing Sheets (58) Field of Classification Search
USPC .......................................................... 717/109
See application file for complete search history.

(56) References Cited

U.S. PATENT DOCUMENTS

| | | | | |
|---|---|---|---|---|
| 6,996,800 | B2* | 2/2006 | Lucassen et al. | 717/106 |
| 7,650,592 | B2* | 1/2010 | Eckels et al. | 717/125 |
| 7,809,785 | B2 | 10/2010 | Appleton et al. | |
| 7,941,783 | B1* | 5/2011 | Kishnani et al. | 717/100 |
| 8,327,332 | B2* | 12/2012 | Sutanto et al. | 717/124 |
| 8,336,029 | B1* | 12/2012 | McFadden et al. | 717/124 |
| 8,356,277 | B1* | 1/2013 | Bank et al. | 717/111 |
| 2004/0172623 | A1* | 9/2004 | Eckels et al. | 717/125 |
| 2006/0101388 | A1* | 5/2006 | Amsden et al. | 717/106 |
| 2009/0210631 | A1* | 8/2009 | Bosworth et al. | 711/141 |
| 2010/0058297 | A1* | 3/2010 | Sutanto et al. | 717/128 |
| 2011/0067004 | A1* | 3/2011 | Birsan et al. | 717/125 |
| 2012/0246619 | A1* | 9/2012 | Thirumalai et al. | 717/124 |
| 2014/0372461 | A1* | 12/2014 | David et al. | 707/756 |
| 2015/0378688 | A1* | 12/2015 | Jiang et al. | 717/109 |

OTHER PUBLICATIONS

CN Application 201410301689.1, entitled "Developing Rich Internet Application", filed on Jun. 27, 2014.

Mell et al., "The NIST Definition of Cloud Computing: Recommendations of the National Institute of Standards and Technology," National Institute of Standards and Technology, U.S. Department of Commerce, Special Publication 800-145, Sep. 2011, 7 pages, Gaithersburg, MD.

* cited by examiner

DEVELOPING RICH INTERNET APPLICATION

BACKGROUND

Various embodiments of the present invention relate to the development of network applications, and more specifically, to a method and apparatus for developing a Rich Internet Application (RIA).

With the development of Internet technology, web-based applications now can provide increasingly powerful functions. So far there has been proposed a RIA technology that is gradually replacing a traditional, web page-based development mode.

The traditional development pattern of web applications is page based. When a user clicks on a certain web element (e.g. a link) in a current web page, the web application will be redirected to a new link address and load a new web page. Although most of the content in the new web page is the same as content in the current web page (such as the title bar at the top of the web page, the navigation bar at the left of the page, etc.), since the new web page corresponds to a new URL address, the same content still needs to be reloaded when displaying the new web page.

RIAs make it possible to modify part of contents in a web page without refreshing the entire web page, providing an improvement to web page-based applications. With the RIA technology, it is possible to build only one web page and implement desired functions by controlling the displayed contents of the page. Thereby, repeated efforts for building a plurality of web pages can be reduced greatly, thereby enhancing the working efficiency of developers.

Nevertheless, since RIAs are integrated with functions that used to be performed by a plurality of web pages, the complexity of RIA code will be raised significantly. Typically, when developing a RIA, a huge code set might be involved, which usually comprises various types of code (such as Hypertext Markup Language HTML code, JavaScript code, and Cascading Style Sheets CSS code). Moreover, collaboration of a couple of developers is usually needed in developing the RIA. During development by a plurality of developers, each developer may edit part of code in the code set. After various developers complete their work, codes developed by them are integrated together for debugging. However, as developers may be unaware of the code details of other developers during development, codes written by different developers might have some conflicts. These conflicts may not be detectable when using existing development tools. As a result, many problems may arise when debugging an entire RIA, and source of the problems may not be rapidly locatable using existing technical solutions.

SUMMARY

Embodiments of this disclosure are directed towards a method for developing a Rich Internet Application. The method includes defining a first code space used for a first code set, the first code set being associated with a first view that is to be displayed in the Rich Internet Application; and adjusting the first code space so that the adjusted code space is independent of a second code space used for a second code set, wherein the second code set is associated with a second view that is to be displayed in the Rich Internet Application.

According to embodiments of the present invention, an apparatus for developing a Rich Internet Application may include a defining module configured to define a first code space used for a first code set, the first code set being associated with a first view that is to be displayed in the Rich Internet Application; and an adjusting module configured to adjust the first code space so that the adjusted code space is independent of a second code space used for a second code set, wherein the second code set is associated with a second view that is to be displayed in the Rich Internet Application.

By means of the method and apparatus as described in the present invention, code sets may be isolated among various developers collaborating in developing a Rich Internet Application, so that developers can better focus on their own programming objects without caring about code details of other developers.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Embodiments of the present disclosure will be described in more detail with reference to the accompanying drawings, in which certain embodiments have been illustrated. However, embodiments of the present disclosure can be implemented in various manners, and thus should not be construed to be limited to the embodiments disclosed herein. On the contrary, those embodiments are provided for the thorough and complete understanding of the present disclosure, and for completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
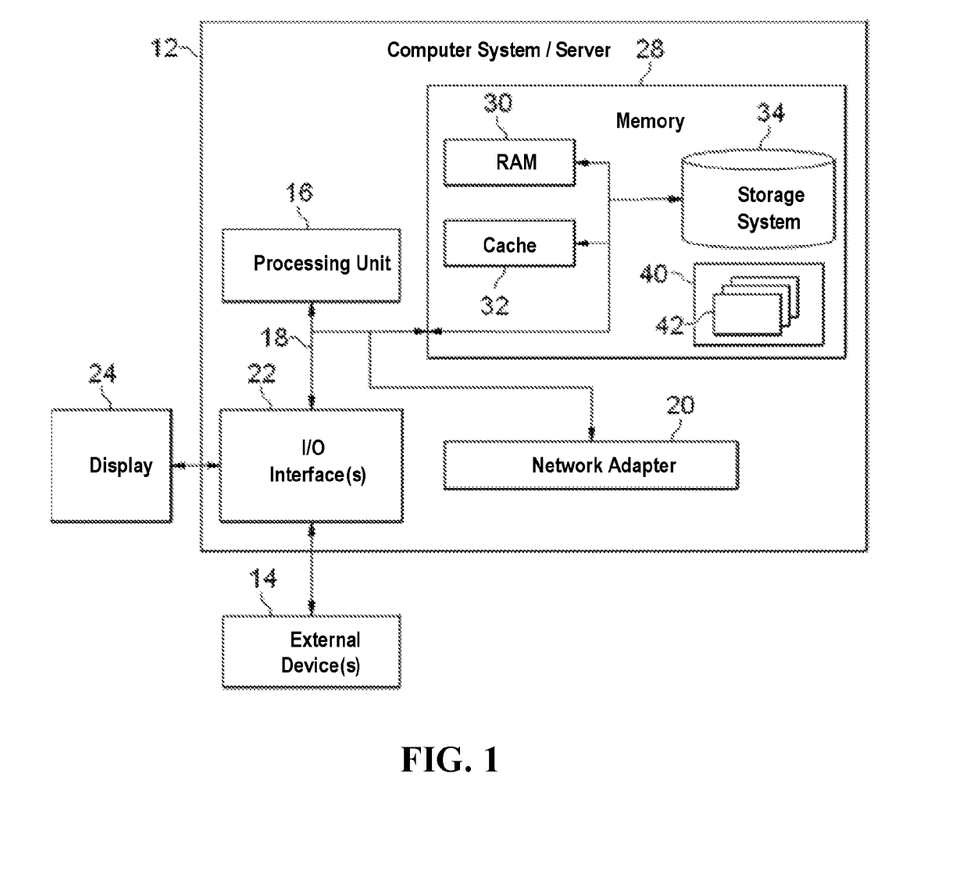
FIG. 1 schematically depicts a block diagram of an exemplary computer system/server which is applicable to implement the embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
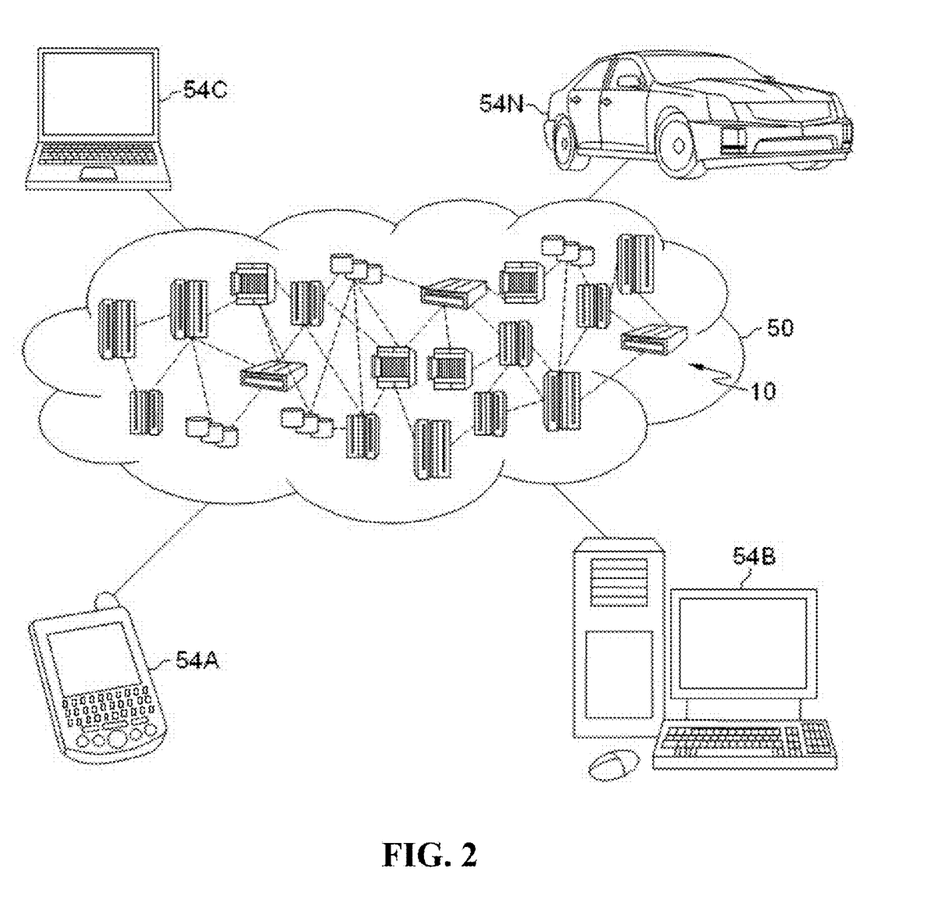
FIG. 2 schematically depicts an exemplary cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers may communicate. The local computing devices may be, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
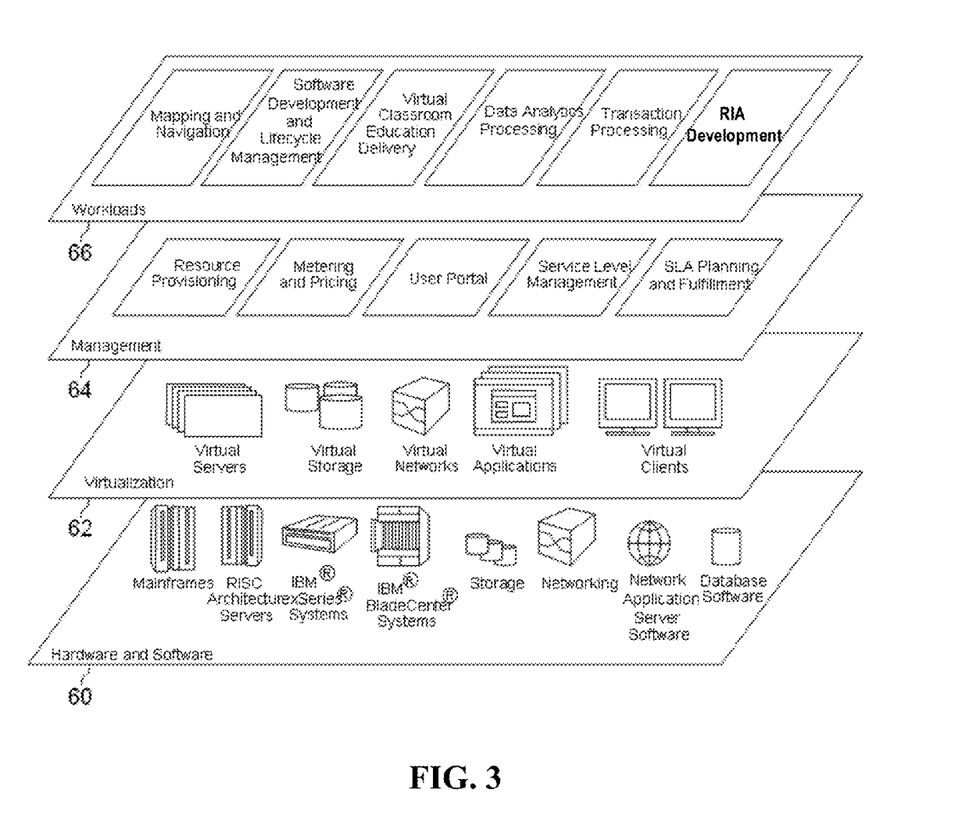
FIG. 3 schematically depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes (e.g. IBM® zSeries® systems); RISC (Reduced Instruction Set Computer) architecture based servers (e.g., IBM pSeries® systems); IBM xSeries® systems; IBM BladeCenter® systems; storage devices; networks and networking components. Examples of software components include network application server software (e.g., IBM WebSphere® application server software); and database software (e.g., IBM DB2® database software). (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Rich Internet Application developing.

In one embodiment of the present invention, a technical solution for developing Rich Internet Applications according to various embodiments of the present invention may be implemented at workloads layer 66, so that tools for developing Rich Internet Applications may be conveniently provided to users in the cloud computing environment. Specifically, various embodiments of the present invention may be implemented as web browser plug-ins so that users develop Rich Internet Applications on the basis of the web browser.

Note that although an application environment of the present invention has been illustrated above by means of the cloud environment, those skilled in the art should understand the embodiments of the present invention may further be implemented in an integrated development environment (IDE) or in any other type of computing environment that is currently known or to be developed later.

Figure 4:
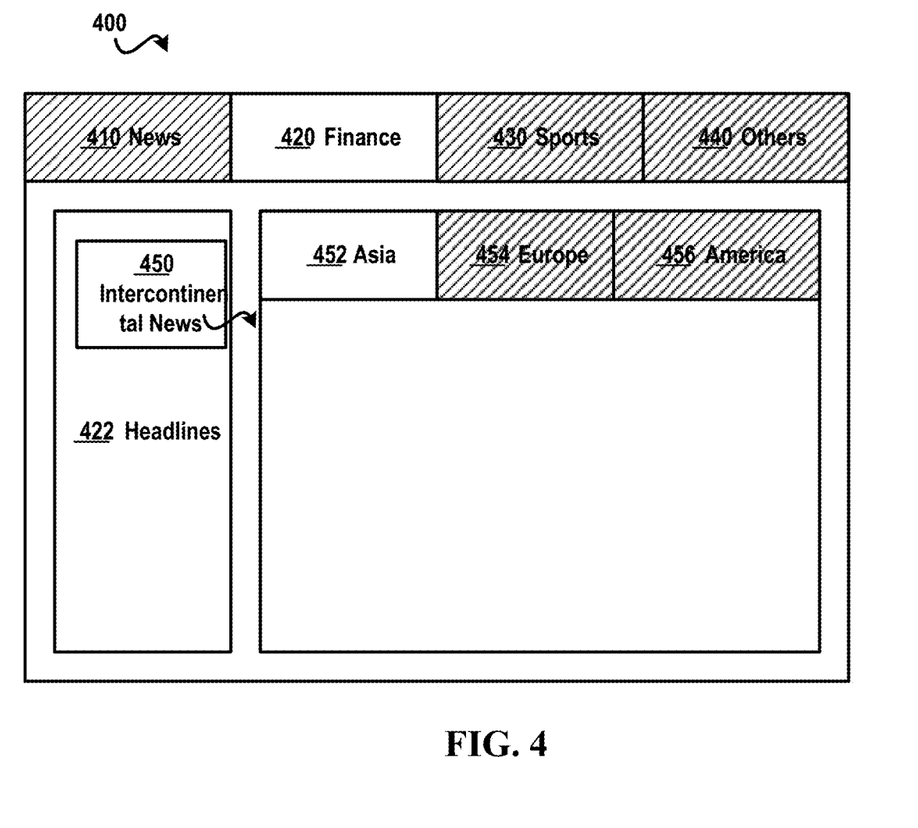
FIG. 4 depicts a schematic view of a web page of a Rich Internet Application.

FIG. 4 shows a schematic view 400 of a web page of a Rich Internet Application. As shown in this figure, the web page of the Rich Internet Application may comprise a plurality of paging tabs (e.g., the Rich Internet Application may comprise news 410, finance 420, sports 430 and others 440). At this point, each paging tab may be regarded as a view, and each paging tab may further comprise other views. For example, finance 420 may comprise two views, namely headlines 422 and intercontinental news 450. Further, intercontinental news 450 may further comprise other views, such as Asia 452, Europe 454, and America 456.

With Rich Internet Applications, for example when it is necessary to switch from Asia 452 to Europe 454, other parts of the web page remain unchanged and do not need to be reloaded. When developing a Rich Internet Application, a plurality of developers may collaborate in developing the Rich Internet Application as shown in FIG. 4. For example, a developer A (not shown) may develop code associated with Asia 452, and a developer B (not shown) may develop code associated with Europe 454. Under the existing development pattern, different developers may not care about details of codes written by other developers, so conflicts might exist among codes developed by various developers.

When a conflict arises, it may be difficult to locate a cause behind the conflict, and huge manual operations may be needed in order to find the cause. Therefore, it may be desired to develop a technical solution that is capable of separating different code sets associated with different views displayed in the Rich Internet Application. Specifically, it may be desired to remove conflicts (such as a naming conflict) among code sets developed by the same or different developers, so that code developed by various developers are unique in global scope. Further, it may be desired to separately display code written by one developer and code written by another developer, so that developers can conveniently understand codes associated with various views.

Figure 5:
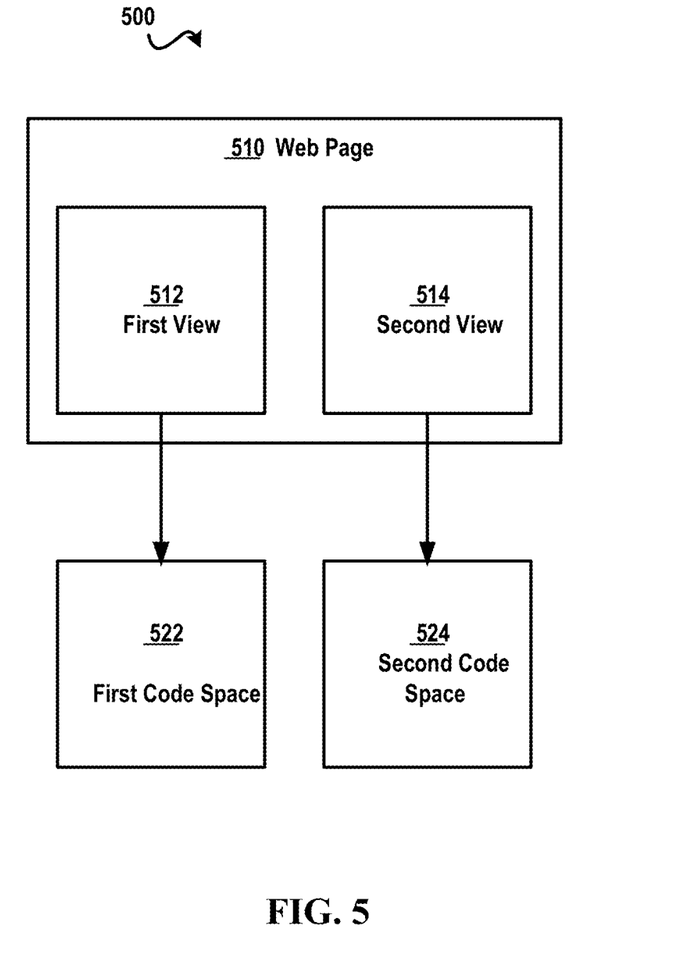
FIG. 5 schematically depicts a block diagram of a technical solution for developing a Rich Internet Application according to embodiments of the present invention.

To this end, the present invention provides a technical solution for developing a Rich Internet Application. FIG. 5 shows a block diagram 500 of a technical solution for developing a Rich Internet Application according to one embodiment of the present invention. A web page 510 schematically shows two views in the Rich Internet Application, namely a first view 512 and a second view 514. As shown in FIG. 5, a first code space 522 and a second code space 524 are defined with respective code sets, wherein the code sets are respectively associated with first view 512 and second view 514.

According to the embodiments of the present invention, a code space is for describing transactions related to writing and/or displaying code during development, where the code is code associated with a view that is to be displayed in the Rich Internet Application.

Embodiments of the present invention, propose a method for developing a Rich Internet Application. The method includes defining a code space used for a first code set, the first code set being associated with a first view that is to be displayed in the Rich Internet Application; and adjusting the first code space so that the adjusted code space is independent of a second code space used for a second code set, wherein the second code set is associated with a second view that is to be displayed in the Rich Internet Application.

Figure 6:
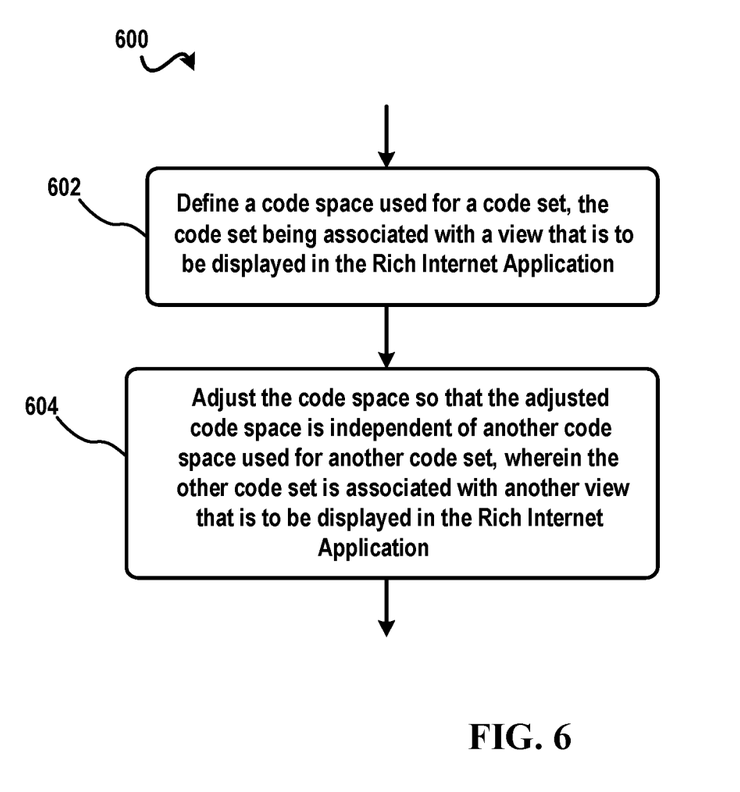
FIG. 6 schematically depicts a flowchart of a method for developing a Rich Internet Application according to embodiments of the present invention.

FIG. 6 shows a flowchart 600 of a method for developing a Rich Internet Application according to embodiments of the present invention. In step 602, a code space used for a code set is defined, the code set being associated with a view that is to be displayed in the Rich Internet Application. Specifically, the code space may be defined on the basis of an association relationship between a code set (including code that is already written and/or to be written later) declared by the developer and a view that is to be displayed in the Rich Internet Application.

For example, the code set of the Rich Internet Application may comprise three types of code (HTML code, JavaScript code, and CSS code), and the code space may be defined on the basis of an association relationship defined by the developer. Suppose the developer, for example, defines an association relationship as shown in Table 1 with respect to a view viewA, then the code space associated with viewA may be represented by a data structure such as the data structure shown in Table 2.

TABLE 1

| Association Relationship |
|---|
| Source codes:<br>JavaScript Codes(a.js, b.js,...);<br>Css Codes(x.css, y.css, ...);<br>Html codes(p.html, ...); |

TABLE 2

| Code Space |
|---|
| Codespace {<br>View: viewA;<br>Js_file: "a.js", "b.js";<br>Css_file: "x.css", "y.css";<br>Html_file: "p.html";<br>...<br>} |

The code space shown in Table 2 represents a code space corresponding to view viewA and comprises JavaScript code a.js and b.js, CSS code x.css and y.css, as well as a HTML code p.html. Table 2 illustrates one example of a code space, and those skilled in the art may further define other data structures to describe a code space, which are not detailed here.

Various embodiments of the present invention may relate to the entire procedure of developing the Rich Internet Application. Early in development, views that are to be displayed in the Rich Internet Application along with the functions of the various views may be defined in the demand analysis phase. Although a code set may be empty at this point (e.g., there may be no code in the code set), a code space may still be set for describing transactions related to code writing and code display in future development. For example, regarding the example as shown in Table 2, only names of various types of files may be defined, such as a.js, b.js, x.css, y.css etc., and at this point various code files may be empty.

The code set gets richer during development, and as the code set changes, so does the code space. In addition, when part of code has been developed on the basis of traditional technology, and a technical solution as described in the present invention is used to continue developing the Rich Internet Application, a code space may also be defined for the developed code set.

In step 604, the code space (e.g. a first code space) can be adjusted so that the adjusted code space is independent of another code space (e.g., a second code space) used for another code set (e.g., a second code set), wherein the other code set is associated with another view (e.g., a second view) that is to be displayed in the Rich Internet Application. In this embodiment, respective code spaces may be defined for different views, and subsequently code spaces may be adjusted so that code spaces defined for different code sets are independent of each other. Note "to be independent" here means causing code within two code spaces not to conflict. Specifically, "to be independent" means that various transactions (such as code naming and display) will not conflict when writing codes associated with different views that are to be displayed in the Rich Internet Application.

According to various embodiments of the present invention, the code space includes a naming space of the code set, and the adjusting the code space so that the adjusted code space is independent of the other code space used for the other code set includes transforming in the naming space the code set into a view code set, the view being displayed when running executable code generated by the view code set.

One aspect of the conflict between code sets lies in naming space conflict. For example, developer A is writing code used for viewA, while developer B is writing code used for viewB, and both developers define a function ViewInitialization( ) within their respective code sets. When running the entire Rich Internet Application, a conflict might arise due to the duplication of function names in the two code sets. Therefore, it may be necessary to eliminate the naming conflict between various code sets.

When each developer independently writes and debugs code developed by themselves, although relevant functions of views can be performed, conflicts might arise when code sets of various developers are integrated and debugged. At this point, the code set may be transformed into a view code set in each naming space. The view code set is a set of code generated on the basis of the original code set, with the transformed code retaining functions of original code while eliminating conflicts between various code spaces. Furthermore, the view associated with the view code set can be displayed normally when running executable code generated by the view code set.

The transforming the code set into a view code set might involve various aspects. In one embodiment of the present invention, transforming in the naming space the code set into a view code set includes transforming an element name in the code set so that the transformed element name is unique in the naming space (e.g., a first naming space) and other naming space (e.g., a second naming space) used for another code set.

The code set may comprise a variety of elements, such as variables, functions, and data structures. Generally speaking, a prefix or a postfix may be added to each element name, whereby the element name in a code set is transformed into an element name distinguished from other element names. Since various types of code like HTML, JavaScript and CSS might be involved in developing the Rich Internet Application, different transformation steps may be performed with respect to all types of code.

In one embodiment of the present invention, the code set includes at least one of the following types of code: HTML code, JavaScript code, and CSS code, and transforming an element name in the code set includes, with respect to at least one type of code, transforming the element name in the code set.

Figure 7A:
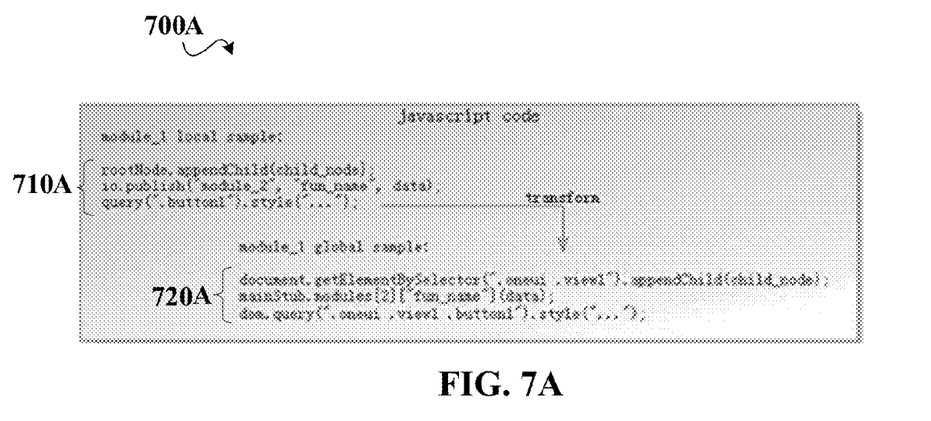
FIGS. 7A and 7B schematically depict block diagrams of transforming in a naming space a code set into a view code set according to embodiments of the present invention.
Figure 7B:
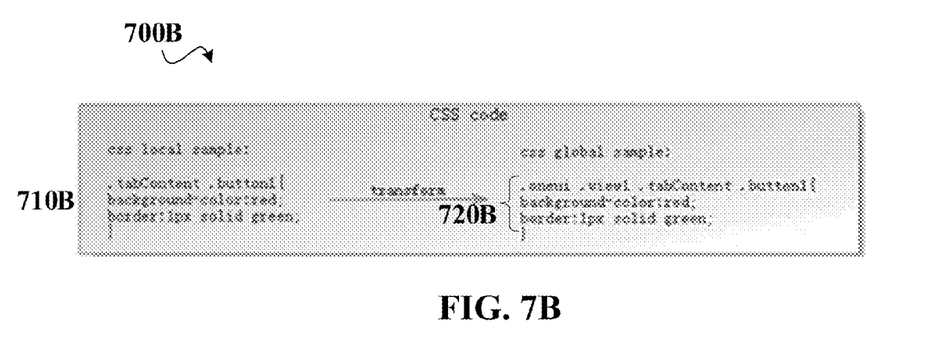

Specifically, FIGS. 7A and 7B show block diagrams 700A and 700B of transforming in the naming space the code set into a view code set according to embodiments of the present invention, respectively. FIG. 7A shows a block diagram of transforming a JavaScript code set into a view code set according to embodiments of the present invention. In some embodiments of the present invention, a code segment 710A in an original code set may be transformed into a code segment 720A in a view code set. For example, the transformation may be implemented by encapsulating original code segment 710A. Specifically, code segment 710A in the original code set may be specified to be associated with a specific view by using a statement document.getElementBySelector (".oneui.view1"), so that contents of code segment 710A may be specified not only to be unique in scope associated with the view ".oneui.view1" but also to be independent of code sets associated with other views.

As shown in FIG. 7A, original code segment 710A is transformed into code segment 720A. Further, various element names in code sets associated with different views may be isolated by using document.getElementBySelector (".oneui.view1").appendChild(child_node) and dom.query (".oneui.view1.button1").style(" . . . "). These two statements in code segment 720A are unique among code that is developed with respect to various views in the Rich Internet Application; in other words, these two statements are unique in a global code space and will not conflict with other statements in the naming aspect. In some embodiments of the present invention, an element in JavaScript code may be transformed by encapsulation.

As shown in FIG. 7B, in one embodiment of the present invention, a code segment 710B in an original code set may be transformed into a code segment 720B in a view code set. For example, code segment 710B in the original code set may be processed by prefixing. As shown in FIG. 7B, a prefix ".oneui.view1" may be added to an element ".tabContent.button1" in code segment 710B, so the transformed element in code segment 720B in the view code set may be represented as ".oneui.view1.tabContent.button1". In this manner, code in the view code set is not only unique in scope associated with a specific view but also independent of code sets associated with other views. In one embodiment of the present invention, regarding elements of variable and function types, they may be transformed by adding a prefix.

Encapsulation and adding a prefix serve as examples of isolating various code sets above. Those skilled in the art should understand the purpose of transformation lies in encapsulating or adding a prefix to the original element name so as to ensure that the transformed element name keeps unique across a plurality of code sets associated with a plurality of views.

Those skilled in the art may further use other approach to transforming the original code set into a view code set on the basis of the principle as described in the present invention. For example, a mapping function may be built to describe a mapping relationship between an element name in the original code set and an element name in the view code set, or further transformation may be implemented on the basis of a mapping dictionary. Here the transformation method is not limited to the exemplary method shown in the present invention, so long as a transformation method being used can transform an element name appearing in the original code set into an element name that keeps unique across different code sets associated with different views.

In the context of the present invention, it is not limited whether transformation is implemented with respect to each element name in the original code set, but first it may be judged whether the element name is unique in corresponding code sets associated with a plurality of views in the Rich Internet Application, and transformation may be implemented only when it is found the element name is not unique.

In one embodiment of the present invention, transforming an element name in the code set includes transforming the element name on the basis of an identifier of the view. Each view in the Rich Internet Application may have a globally unique identifier. To simplify the transformation step, the element name may be transformed on the basis of an identifier of the view. For example, suppose both viewA and viewB define a function ViewInitialization( ), then at this point the two function names may be transformed into viewA.ViewInitialization( ) and viewB.ViewInitialization( ) respectively. Where other mapping function is used, other transformation result may be produced.

In one embodiment of the present invention, the code space further includes a display space (e.g., a first display space) used for displaying the code set and adjusting the code space so that the adjusted code space is independent of the other code space used for the other code set. In addition, an embodiment further includes displaying the display space independently of displaying another display space (e.g., a second display space) used for the other code set.

Figure 8:
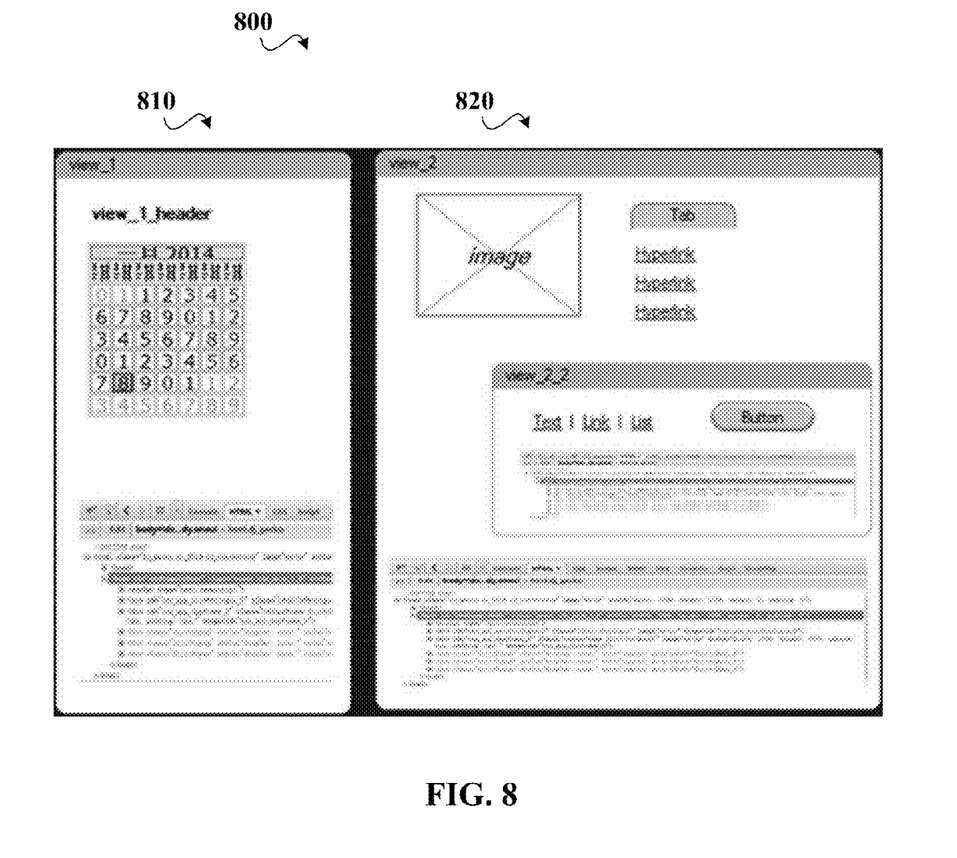
FIG. 8 depicts a schematic view of an interface for developing a Rich Internet Application according to embodiments of the present invention.

With reference to FIG. 8, the following description discusses to how to isolate the display space. FIG. 8 shows a schematic view 800 of an interface for developing a Rich Internet Application according to embodiments of the present invention. As shown in FIG. 8, the Rich Internet Application comprises two views, namely view_1 and view_2. In the development interface, display spaces 810 and 820 used for view_1 and view_2 may be displayed independently. The display space for example may comprise a view and a code set associated with the view.

According to the embodiments of the present invention, a corresponding display space may be displayed according to a location where the view is displayed in the Rich Internet Application; a display space for a view may be maximized; or only a display space of a selected view may be displayed. In this manner, various developers collaborating in programming may visually learn code that is being written by other developers, thereby making it convenient for various developers to communicate.

In one embodiment of the present invention, the view includes at least one of: a web element and another view (e.g., a second view). Note in the context of the present invention the view may comprise basic web elements used for building a web page, such as text, images, CSS, and JavaScript; in addition, another view may be nested in the view. View 450 as shown in FIG. 5 may further comprise three views such as views 452, 454 and 456.

According to task division among developers, the view may be defined at different granularities. For example, when different developers develop codes associated with views 450, 452, 454 and 456, respective code spaces may be defined for 4 code sets associated with these 4 views, so as to ensure that various code spaces are independent of one another and further conflicts caused by the same element name among different developers may be eliminated.

For another example, when the same developer develops views 450, 452, 454 and 456, view 450 may act as a top-level view, and only a code space for a code set associated with view 450 may be defined; or a code space may be defined for each view.

Some embodiments of the present invention may further include building the view code set so as to form intermediate code; and running the intermediate code for debugging. Various embodiments of the present invention further provide a technical solution for debugging on the basis of a code space. The view code set resulting from the transformation may be built to form intermediate code, and afterwards the intermediate code is run for debugging. For example, the debugging may be implemented on the basis of the development interface as shown in FIG. 8. For example, in display space 810 used for view_1, a result from running developed code may be displayed at the upper part, and code being developed may be displayed at the lower part.

The building may have different meaning in different development environments. In one embodiment of the present invention, the building of the view code set so as to form intermediate code includes at least one of: in an integrated development environment, compiling the view code set to form the intermediate code; and in a web-based development environment, compressing the view code set to form the intermediate code. Those skilled in the art may implement the building step using known compilation and compression technical solutions, which are not detailed in the context of the present invention.

In one embodiment of the present invention, the methods disclosed herein are executed by a browser plug-in in a web-based development environment. Those skilled in the art should understand various embodiments of the present invention may be compatible with the existing web-based development environment. For example, the embodiments of the present invention may be implemented as a browser plug-in, so as to be integrated with development tools in the prior art like Firebug, Chrome Dev and so on.

Various embodiments implementing the methods of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided a system based on the same invention concept. Even if the system has the same hardware structure as a general-purpose processing device, the functionality of software contained therein makes the system manifest distinguishing properties from the general-purpose processing device, thereby forming a system of the various embodiments of the present invention. The system described in the present invention comprises several modules, the modules configured to execute corresponding functions. Upon reading this specification, those skilled in the art may understand how to write a program for implementing actions performed by these modules. Since the system is based on the same invention concept as the method, the same or corresponding implementation details are also applicable to modules corresponding to the method. As detailed and complete description has been presented above, the apparatus is not detailed below.

Figure 9:
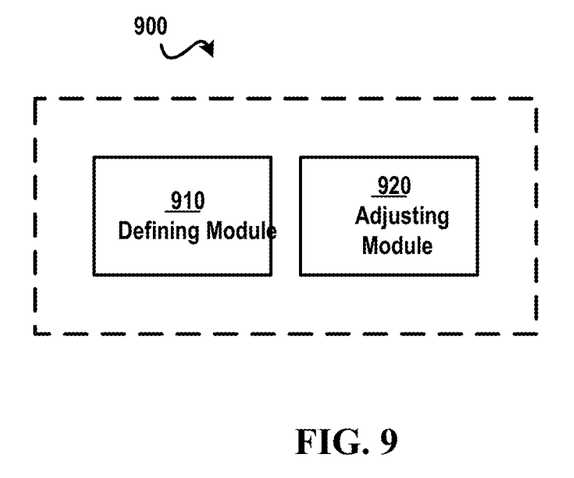
FIG. 9 schematically depicts a block diagram of an apparatus for developing a Rich Internet Application according to embodiments of the present invention.

FIG. 9 schematically shows a block diagram 900 of a system for developing a Rich Internet Application according to one embodiment of the present invention. Specifically, there is provided an system for developing a Rich Internet Application, the system including a defining module 910 configured to define a code space used for a code set, the code set being associated with a view that is to be displayed in the Rich Internet Application; and an adjusting module 920 configured to adjust the code space so that the adjusted code space is independent of another code space used for another code set, wherein the other code set is associated with another view that is to be displayed in the Rich Internet Application.

In one embodiment of the present invention, the code space comprises a naming space of the code set, and adjusting module 920 includes a transforming module configured to transform in the naming space the code set into a view code set, the view being displayed when running executable code generated by the view code set.

In one embodiment of the present invention, the transforming module includes a name transforming module configured to transform an element name in the code set so that the transformed element name is unique in the naming space and another naming space used for the other code set.

In one embodiment of the present invention, the code set at least comprises any one of the following types of code: HTML code, JavaScript code, and CSS code, and wherein the transforming module includes a mapping module configured to, with respect to at least one type of code, transform an element name in the code set.

In one embodiment of the present invention, the name transforming module includes an element name transforming module configured to transform the element name on the basis of an identifier of the view.

In one embodiment of the present invention, the code space further includes a display space used for displaying the code set, and the adjusting module having a displaying module configured to display the display space independently of displaying another display space used for the other code set.

In one embodiment of the present invention, the view includes at least an item selected from the group consisting of a web element and another view.

Embodiments of the present invention further include a building module configured to build the view code set so as to form intermediate code; and a debugging module configured to run the intermediate code for debugging.

In one embodiment of the present invention, the building module includes a first building module configured to, in an integrated development environment, compile the view code set to form the intermediate code; and a second building module configured to, in a web-based development environment, compress the view code set to form the intermediate code.

In one embodiment of the present invention, the system is executed by a browser plug-in in the web-based development environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for developing a Rich Internet Application, comprising:

defining a first code space of the Rich Internet Application, wherein the first code space is a first data structure associating a first view of the Rich Internet Application with a first code set having at least one first source file having first source code for generating the first view, wherein the first view is at least one web element and the data structure associates the first view with the first code set by storing identifiers of both the first view and the at least one first source file;

adjusting, automatically by a processor and based on the first data structure, the first code space so that the adjusted first code space is independent of a second code space of the Rich Internet Application, wherein the second code space is a second data structure associating a second view of the Rich Internet Application with a second code set having at least one second source file having second source code for generating the second view, wherein adjusting the first code space includes automatically modifying the first source code using the stored identifiers of both the first view and the at least one first source file to generate a modified first source file having modified first source code; and presenting, in a first display space, a display of the first source file having first source code to a developer for debugging while presenting the modified first source file having modified first source code to an Internet browser to execute to generate the first view.

2. The method according to claim 1, wherein the first code space is associated with a first naming space defined by the association of the first view and the first code set, and the adjusting the first code space so that the adjusted first code space is independent of the second code space further comprises:

transforming in the first naming space the first code set into a view code set, the first view being displayed when running executable code generated by the view code set.

3. The method according to claim 2, wherein the transforming in the first naming space the first code set into the view code set comprises:

transforming an element name in the first code set so that the transformed element name is unique in the first naming space and a second naming space used for the second code set.

4. The method according to claim 3, wherein the first code set includes at least one type of computer code selected from the group consisting of hyper text markup language (HTML) code, JavaScript code, and cascading style sheets (CSS) code, and wherein the transforming an element name in the first code set comprises:

transforming, with respect to the at least one type of code, the element name in the first code set.

5. The method according to claim 3, wherein transforming the element name in the first code set comprises:

transforming the element name using an identifier of the first view stored in the first data structure.

6. The method according to claim 3, further comprising:

building the view code set so as to form intermediate code; and running the intermediate code for debugging.

7. The method according to claim 6, wherein the building the view code set so as to form the intermediate code comprises at least one of:
compiling, when developing the Rich Internet Application in an integrated development environment, the view code set to form the intermediate code; and
compressing, when developing the Rich Internet Application in a web-based development environment, the view code set to form the intermediate code.

8. The method according to claim 7, wherein the method is executed by a browser plug-in in the web-based development environment.

9. The method according to claim 1, wherein the first code space is associated with a first display space for displaying the first code set, and the adjusting the first code space so that the adjusted code space is independent of the second code space further comprises:
displaying the first display space independently of displaying a second display space for the displaying second code set.

10. The method according to claim 1, wherein the at least one web element includes the second view.

11. An apparatus for developing a Rich Internet Application, comprising:
a processor;
a definition portion to define, automatically by the processor, a first code space of the Rich Internet Application, wherein the first code space is a first data structure associating a first view of the Rich Internet Application with a first code set having at least one first source file having first source code for generating the first view, wherein the first view is at least one web element and the data structure associates the first view with the first code set by storing identifiers of both the first view and the at least one first source file;
an adjustment portion to adjust, automatically by the processor and based on the first data structure, the first code space so that the adjusted first code space is independent of a second code space of the Rich Internet Application, wherein the second code space is a second data structure associating a second view of the Rich Internet Application with a second code set having at least one second source file having second source code for generating the second view,
wherein adjusting the first code space includes automatically modifying the first source code using the stored identifiers of both the first view and the at least one first source file to generate a modified first source file having modified first source code; and
a presentation portion to present, automatically by the processor, in a first display space, a display of the first source file having first source code to a developer for debugging while presenting the modified first source file having modified first source code to an Internet browser to execute to generate the first view.

12. The apparatus according to claim 11, wherein the first code space is associated with a first naming space of the first code set, and the adjustment portion comprises:
a transformation portion to transform in the first naming space the first code set into a view code set, the first view being displayed when running executable code generated by the view code set.

13. The apparatus according to claim 12, wherein the first code set includes at least one type of computer code selected from the group consisting of hyper text markup language (HTML) code, JavaScript code, and cascading style sheets (CSS) code, and wherein the name transformation portion comprises:
a mapping portion to, with respect to at least one type of code, transform an element name in the first code set.

14. The apparatus according to claim 11, wherein the transformation portion comprises:
a name transformation portion to transform an element name in the first code set so that the transformed element name is unique in the first naming space and a second naming space used for the second code set.

15. The apparatus according to claim 14, wherein the name transformation portion comprises:
an element name transformation portion to transform the element name using an identifier of the first view stored in the first data structure.

16. The apparatus according to claim 14, further comprising:
a build portion to build the view code set so as to form an intermediate code; and
a debug portion to run the intermediate code for debugging.

17. The apparatus according to claim 16, wherein the build portion comprises:
a first build portion to, in an integrated development environment, compile the view code set to form the intermediate code; and
a second build portion to, in a web-based development environment, compress the view code set to form the intermediate code.

18. The apparatus according to claim 17, wherein the apparatus is executed by a browser plug-in in the web-based development environment.

19. The apparatus according to claim 11, wherein the first code space is associated with a first display space used for displaying the first code set, and the adjustment portion further comprises:
a display portion to display the first display space independently of displaying a second display space for the second code set.

20. The apparatus according to claim 11, wherein the at least one web element includes the second view.

* * * * *